United States Patent
Cao et al.

(10) Patent No.: US 10,026,648 B2
(45) Date of Patent: Jul. 17, 2018

(54) FDSOI WITH ON-CHIP PHYSICALLY UNCLONABLE FUNCTION

(71) Applicant: INTERNATIONAL BUSINESS MACHINES CORPORATION, Armonk, NY (US)

(72) Inventors: Qing Cao, Yorktown Heights, NY (US); Kangguo Cheng, Schenectady, NY (US); Zhengwen Li, Chicago, IL (US); Fei Liu, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 185 days.

(21) Appl. No.: 15/063,644

(22) Filed: Mar. 8, 2016

(65) Prior Publication Data

US 2017/0263575 A1 Sep. 14, 2017

(51) Int. Cl.

| | |
|---|---|
| *G06F 21/00* | (2013.01) |
| *H01L 21/768* | (2006.01) |
| *G06F 21/44* | (2013.01) |
| *H01L 29/78* | (2006.01) |
| *H01L 27/12* | (2006.01) |
| *H01L 21/84* | (2006.01) |
| *H01L 27/112* | (2006.01) |
| *H01L 23/00* | (2006.01) |

(52) U.S. Cl.
CPC ........ *H01L 21/76877* (2013.01); *G06F 21/44* (2013.01); *H01L 21/76816* (2013.01); *H01L 21/84* (2013.01); *H01L 27/11233* (2013.01); *H01L 27/1203* (2013.01); *H01L 29/7838* (2013.01); *H01L 23/57* (2013.01)

(58) Field of Classification Search
USPC ........................................................ 726/2
See application file for complete search history.

(56) References Cited

U.S. PATENT DOCUMENTS

| | | | |
|---|---|---|---|
| 8,386,801 | B2 | 2/2013 | Devadas et al. |
| 8,525,549 | B1 | 9/2013 | Feng et al. |
| 8,749,265 | B2 | 6/2014 | Kim et al. |
| 8,803,328 | B1 | 8/2014 | Song et al. |
| 8,941,405 | B2 | 1/2015 | Chi et al. |
| 8,966,660 | B2 | 2/2015 | Koushanfar et al. |
| 9,030,226 | B2 | 5/2015 | Plusquellic et al. |
| 9,202,554 | B2 | 12/2015 | Chu et al. |
| 2013/0020644 | A1* | 1/2013 | Horita .............. G11C 11/412 257/351 |
| 2013/0106461 | A1* | 5/2013 | Ficke .............. H04L 9/3278 326/8 |
| 2013/0322617 | A1* | 12/2013 | Orshansky ........ H04L 9/3278 380/28 |
| 2015/0123702 | A1 | 5/2015 | McKinley et al. |
| 2015/0222430 | A1 | 8/2015 | Kim et al. |
| 2016/0239684 | A1* | 8/2016 | Choi .................. G06F 21/73 |
| 2017/0038807 | A1* | 2/2017 | Bittlestone .......... G06F 1/26 |

\* cited by examiner

*Primary Examiner* — Jason T Lee
(74) *Attorney, Agent, or Firm* — Tutunjian & Bitetto, P.C.; Vazken Alexanian

(57) ABSTRACT

An integrated circuit includes an array of devices including a physically unclonable function (PUF) for chip authentication. A logic pattern is stored in the devices. The logic pattern is determined in accordance with processing variations during manufacture of the array. The logic pattern is represented with a first state for one or more devices with contact shorts and a second state with one or more devices without contact shorts.

20 Claims, 3 Drawing Sheets

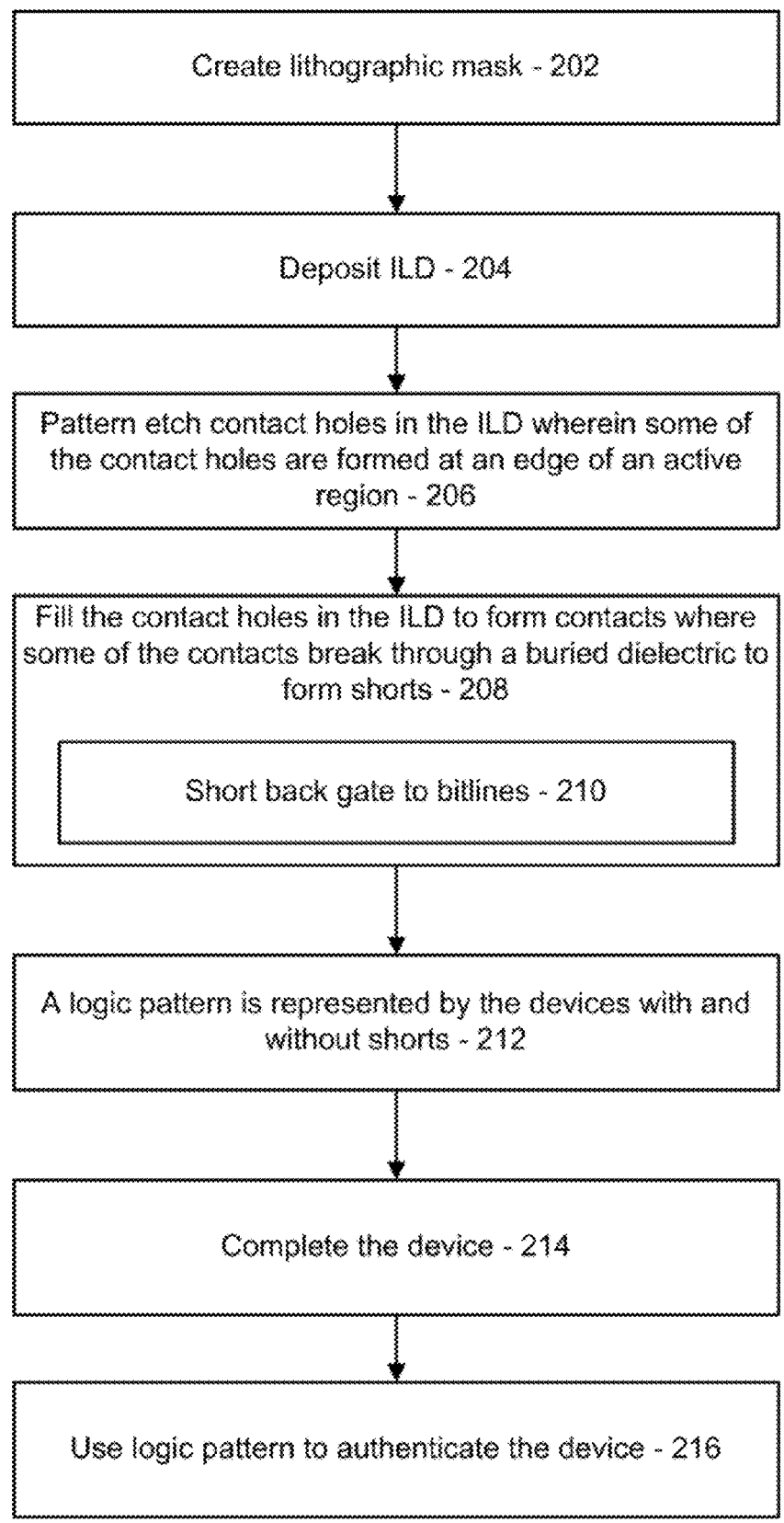

FDSOI WITH ON-CHIP PHYSICALLY UNCLONABLE FUNCTION

TECHNICAL FIELD

The present invention relates to physically unclonable function (PUF) semiconductor devices, and more particularly to PUF devices that employ process variation to create a unique security identifier.

DESCRIPTION OF THE RELATED ART

Chip authentication is becoming increasingly more important for cloud and mobile applications. Chip authentication should ideally be difficult to attack, randomly generated and low cost. One method for providing improved security may include a physically unclonable function (PUF) for chip authentication. PUF is a physical entity that is embodied in a physical structure and is easy to evaluate but difficult to predict. A PUF device needs to be easy to fabricate but nearly impossible to duplicate, even given an exact manufacturing process employed to make the device. Conventional approaches for implementing PUF require additional process steps and thus increase process cost/complexity.

SUMMARY

An integrated circuit includes an array of devices including a physically unclonable function (PUF) for chip authentication. A logic pattern is stored in the devices. The logic pattern is determined in accordance with processing variations during manufacture of the array. The logic pattern is represented with a first state for one or more devices with contact shorts and a second state with one or more devices without contact shorts.

An integrated circuit includes a fully depleted semiconductor-on-insulator substrate (FDSOI) having a back gate formed below a buried dielectric layer of the FDSOI substrate. At least one first device has a shorted contact to the back gate in accordance with processing variations during manufacture of the at least one first device. At least one second device has a contact isolated from the back gate. An array of the at least one first device and the at least one second device are configured to form states of a logic pattern to provide a physically unclonable function (PUF) for chip authentication using the states within the array.

A method for fabricating an integrated circuit includes concurrently patterning contacts holes for first devices and second devices through an interlevel dielectric (ILD) layer, wherein the first devices include a contact hole aligned to an edge of a respective active region and the second devices include a contact hole aligned to completely land on a respective active region; and filling the contact holes with conductive material to form contacts through the ILD such that a portion of the first devices short the respective active region to a back gate in accordance with processing variations during manufacture of the first devices, the portion of the first devices providing a logic pattern employed for a physically unclonable function (PUF) for chip authentication.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein:

FIG. 6 is a block/flow diagram showing methods for fabricating an integrated circuit with PUF authentication in accordance with the present principles.

DETAILED DESCRIPTION

Figure 1:
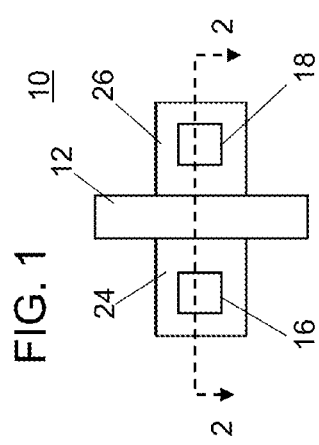
FIG. 1 is a top view of a semiconductor device on an integrated circuit showing contacts landing completely on respective source and drain regions in accordance with the present principles.

In accordance with the present principles, methods and structures are provided for a physically unclonable function (PUF) device that employs process variation to authenticate a chip or chips. In one embodiment, the chip is fabricated such that an authentication key in one manufactured chip will differ in subsequently manufactured chips due to variations in a manufacturing process. In one example, a chip employs contact placement to produce a short between two layers to generate its key. The chip may include metal oxide semiconductor field effect transistor (MOSFET) circuits that employ thin buried oxide (BOX) semiconductor-on-insulator (SOI) technology, where the position of the MOSFET drain and/or source contacts of the authentication circuit are designed to be close to an edge of an active area of the circuit such that fabrication of two or more such chips will have a high probably of a random shift in one or more of the contacts. This results in either one or more shorts through the thin BOX layer to a back gate of the MOSFET (or other layer) and/or one or more contacts to the drain (or source) terminal such that no two chips will be manufactured with the same authentication key.

The present principles may include fully depleted SOI (FDSOI) devices with ultra-thin body and BOX (UTBB) SOI devices that offer a unique capability of back gating for performance improvement and power management. In one useful embodiment, UTBB chips are employed to provide PUF authentication. The present embodiments employ a method and structure for forming UTBB FDSOI chips with PUF. The PUF capability is achieved by intentionally designing a contact at the edge of an active area. Due to the inherent variation of lithography and reactive ion etching (RIE), some contacts fall off the edge of the active areas and electrically short to the back gate. Other contacts are confined within the active area and are isolated from the back gate. As a result, logic "1's" and "0's" can be generated, depending on whether a contact shorts to the back gate. The logic pattern provides an authentication code for the device. One advantage includes that PUF is achieved without the need of any extra process steps. The PUF capability relies on the inherent variation of UTBB FDSOI processes. The FDSOI chip with on-chip PUF may employ the drain contacts of PUF FETs aligned at the edge of the active area, although in some embodiments, it may include the source contacts or both. Field effect transistors (FETs) and PUF FETs can be fabricated by the same process flow, which results in a cost-effective PUF program.

It is to be understood that the present invention will be described in terms of a given illustrative architecture; however, other architectures, structures, substrate materials and process features and steps may be varied within the scope of the present invention.

It will also be understood that when an element such as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The present embodiments may include a design for an integrated circuit chip, which may be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer may transmit the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

Methods as described herein may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

It should also be understood that material compounds will be described in terms of listed elements, e.g., SiGe. These compounds include different proportions of the elements within the compound, e.g., SiGe includes $Si_xGe_{1-x}$ where x is less than or equal to 1, etc. In addition, other elements may be included in the compound, and still function in accordance with the present principles. The compounds with additional elements will be referred to herein as alloys.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 2:
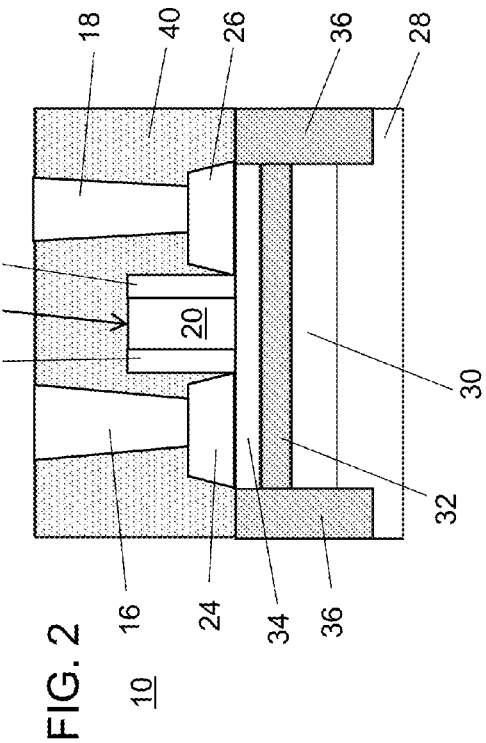
FIG. 2 is a cross-sectional view taken at section line 2-2 of FIG. 1 showing the semiconductor device having contacts landing completely on respective source and drain regions in accordance with the present principles.

Referring now to the drawings in which like numerals represent the same or similar elements and initially to FIG. 1, a top view of a field effect transistor (FET) device 10 is illustratively depicted in accordance with the present principles. Device 10 represents a first configuration where a drain contact 18 lands on a drain region 26. In this first configuration, the contact 18 does not contact any other components, such as, e.g., a back gate 30 (FIG. 2). The device 10 is depicted on a SOI structures, and preferably a FDSOI substrate, although others structures may be employed. The device 10 includes a gate structure 12 that traverses a source region 24 and a drain region 26. As shown, a contact 16 lands on the source region 24, and a contact 18 lands on the drain region 26. In this example, the contact 18 is positioned to fall centrally on the drain region 26 and not be positioned at an edge of the drain region 26. The back gate 30 is formed as a doped well within the base substrate 28.

Referring to FIG. 2, a cross-sectional view is shown taken at section line 2-2 in FIG. 1. The device 10 may be a FDSOI substrate that includes a base substrate 28, a back gate 30, a buried dielectric layer 32 and a semiconductor layer 34. The substrate 28 may include a monocrystalline material, such as, e.g., Si, SiGe, Ge, GaAs, etc. The back gate 30 may include a doped well formed within the substrate 28. The buried dielectric layer 32 may include a buried oxide (BOX) layer, although any suitable dielectric material may be employed. The thin semiconductor layer 34 may include crystalline Si, although other suitable materials may be employed, e.g., SiGe, SiC, Ge, GaAs, etc. The semiconductor layer 34 may include raised source and drain regions 24, 26, respectively. The raised source and drain regions 24, 26 may be epitaxially grown from the semiconductor layer 34.

The semiconductor layer 34 forms a thin channel between the source and drain regions 24, 26. The channel conducts when a threshold voltage is present on the gate structure 12. The gate structure 12 includes a gate conductor 20 formed on a gate dielectric (not shown) or gate oxide (GOX). The gate conductor 20 includes conductive materials, such as, e.g., polycrystalline or amorphous silicon, germanium, silicon germanium, a metal (e.g., tungsten, titanium, tantalum, ruthenium, zirconium, cobalt, copper, aluminum, lead, platinum, tin, silver, gold), a conducting metallic compound material (e.g., tantalum nitride, titanium nitride, tungsten silicide, tungsten nitride, ruthenium oxide, cobalt silicide, nickel silicide), carbon nanotube, conductive carbon, graphene, or any suitable combination of these materials. The conductive material may further comprise dopants that are incorporated during or after deposition. The gate structure 12 includes spacers 22 on lateral sides. The spacers 22 may include a nitride material, although other suitable dielectric materials may be employed. The gate structure 12 may include a dielectric cap (not shown) on top of the gate structure 12.

An interlevel dielectric (ILD) material 40 is deposited over the source region 24, the drain region 26 and the gates structure 12. Contacts openings are patterned into the ILD 40, filled with conductive material and planarized to form contacts 16 and 18. The contacts 16 and 18 may include any suitable conductive material, such as copper, aluminum, tungsten, etc. The contacts 16 and 18 are formed to land on the source regions 24 and the drain region 26.

While the present principles may apply to any device structures, the present illustrative example, shows a SOI metal oxide semiconductor field effect transistor (MOSFET) device 10 configured for use as a memory device or the like, e.g., in an SRAM memory design. While the present principles may be configured for SOI devices that include a PDSOI (partially depleted SOI), a FDSOI (fully depleted SOI) MOSFETs is preferable. For an n-type PDSOI MOSFET, a sandwiched p-type film between a gate oxide (GOX) and buried oxide (BOX) is large, so the depletion region may not cover the whole p region. So the PDSOI behaves like a bulk MOSFET. In FDSOI devices, the front gate (GOX) supports less depletion charge than the bulk so an increase in inversion charge occurs resulting in higher switching speeds.

Figure 3:
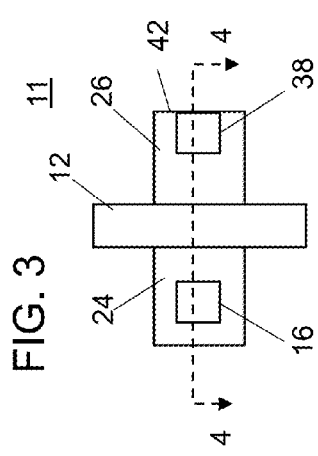
FIG. 3 is a top view of a semiconductor device on an integrated circuit showing one contact landing completely on a source region and another contact being aligned with an edge of the drain region in accordance with the present principles.
Figure 4:
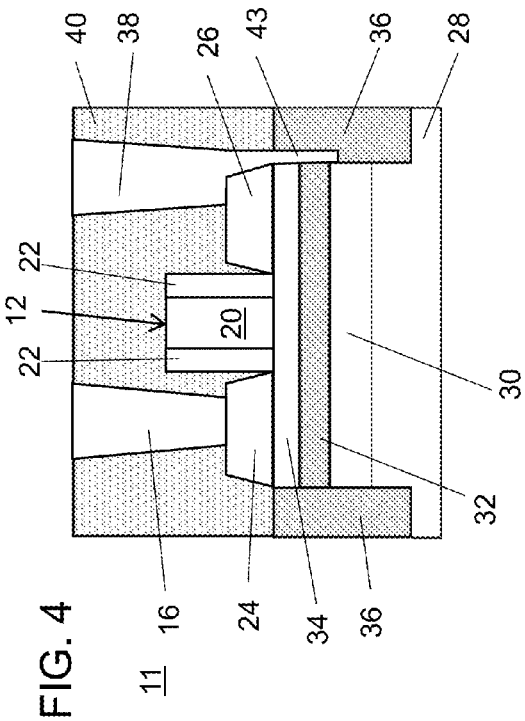
FIG. 4 is a cross-sectional view taken at section line 4-4 of FIG. 3 showing the semiconductor device having one contact landing completely on the source region and another contact being aligned with an edge of the drain region in accordance with the present principles.

Referring to FIG. 3, a top view of the FET device 11 is illustratively depicted with an alternate arrangement in accordance with the present principles. Device 11 represents a second configuration where a drain contact 38 lands on the drain region 26 at or over an edge 42 thereof. In this second configuration, the contact 18 is formed along a lateral side of the drain region 26 to make contact with, e.g., the back gate 30 (FIG. 4). The device 11 is depicted on a SOI structure and preferably a FDSOI substrate although others structures may be employed. The device 11 includes a gate structure 12 that traverses a source region 24 and a drain region 26. As shown, the contact 16 lands on the source region 24, and the contact 38 lands on the drain region 26, but contacts the back gate 30 through the layers 34 and 32. In this example, the contact 38 is positioned at or near the edge 42 of the drain region 26 such that one or more contacts 38 will fall beyond the edge to contact the back gate 30. These one or more shorted contacts 38 will provide a logic state for the second configuration that is different from a logic state of the first configuration (FIGS. 1 and 2) due to the short to the back gate. The logic states of the first and second configurations may be read as states of the FET devices 10 and 11. Since the logic state of the second configuration will depend on manufacturing variation, some of the devices 11 will have shorts to the back gate 30 while others will not. This creates a somewhat random arrangement of logic states that can be employed for PUF.

Unclonability means that each PUF device has a unique and unpredictable way of mapping challenges to responses, even if it was manufactured with the same process as a similar device, and it is infeasible to construct a PUF with the same challenge-response behavior as another given PUF because exact control over the manufacturing process is infeasible. The challenge is mapped based on the logic states. Given the design of the PUF system, without knowing all of the physical properties of the random components, the logic state arrangement is highly unpredictable. These PUF properties can be employed as a unique and untamperable device identifier.

Referring to FIG. 4, a cross-sectional view is shown taken at section line 4-4 in FIG. 3. The device 11 may be a FDSOI substrate that includes the base substrate 28, the back gate 30, the buried dielectric layer 32 and the semiconductor layer 34. The semiconductor layer 34 forms a thin channel between the source and drain regions 24, 26. The channel conducts when a threshold voltage is present on the gate structure 12. The gate structure 12 includes the gate conductor 20 formed on the gate dielectric (not shown) or gate oxide (GOX). The gate structure 12 includes spacers 22 on lateral sides. The gate structure 12 may include the dielectric cap (not shown) on top of the gate structure 12.

The ILD material 40 is deposited over the source region 24, the drain region 26 and the gates structure 12. Contact openings are patterned into the ILD 40, filled with conductive material and planarized to form contacts 16 and 38. The contact opening pattern is dimensioned to fall on the edge of the drain region 26. In some devices 11, the patterned contact hole will extend over the edge of the drain region 26. During the formation of the contacts, some of the contacts will form similarly as contacts 18 on the drain region 26 as depicted in FIG. 2 while others (one or more contacts 38) will form over the edge 42. Some of the contacts 38 that form over the edge of the drain region 26 may include extension or breakthrough regions 43 that contact a lateral side of the drain region 26.

Breakthrough regions 43 are formed by etching (RIE) to form the contact holes, and the etching may remove portions of the layer 32 (BOX) and the STI 36. Some of these contacts 38 may extend enough to short to the back gate 30. Still others (third configuration) may not extend below the drain region 26 enough to create the short to the back gate 30. The third configuration will have the same logic state as the first configuration (depicted in FIG. 2). The contacts 16 and 38 may include any suitable conductive material, such as polycrystalline or amorphous silicon, germanium, silicon germanium, a metal (e.g., tungsten, titanium, tantalum, ruthenium, zirconium, cobalt, copper, aluminum, lead, platinum, tin, silver, gold), a conducting metallic compound material (e.g., tantalum nitride, titanium nitride, tungsten silicide, tungsten nitride, ruthenium oxide, cobalt silicide, nickel silicide), carbon nanotube, conductive carbon, graphene, or any suitable combination of these materials. The conductive material may further comprise dopants that are incorporated during or after deposition. The contact 16 is formed to land centrally on the source region 24. The contacts 38 may or may not short out to the back gate 30.

Since the shape and configuration of the contact 38 will depend on the variations of contact lithography and reactive ion etching (RIE) to form the contact holes, which devices short to the back gate will be distributed about the chip and depend on variations in the manufacturing process.

Figure 5:
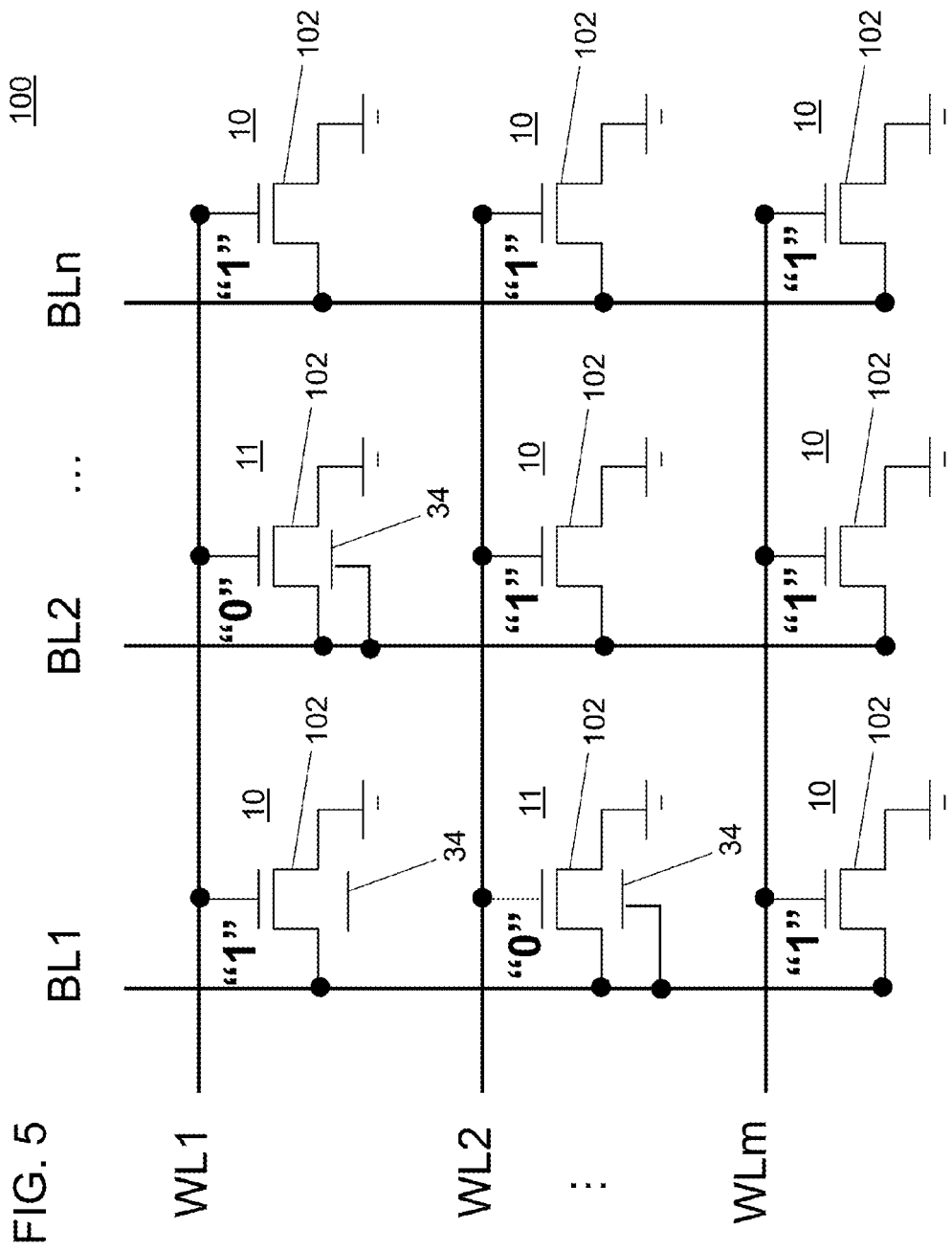
FIG. 5 is a schematic view of a semiconductor device array of transistors for an integrated circuit and showing some devices having contact shorts to a back gate and other devices without shorts to the back gate in accordance with the present principles.

Referring to FIG. 5, a schematic diagram shows an array 100 of transistors 102 (e.g., MOSFETs). The array 100 may include a memory array or an array similar to a memory array. In one embodiment, the array 100 is part of a chip, with the array 100 being a portion fabricated to provide an authentication key that will differ in subsequently manufactured chips due to variations in a manufacturing process. In one example, the chip employs contact placement to produce a short between two layers to generate its key.

The gates of the transistors 102 are connected to wordlines (e.g., WL1, WL2, . . . WLm). Drains of the transistors 102 are connected to bitlines (BL1, BL2 . . . BLn). As mentioned, due to the variations of the manufacturing process, when a drain contact punches through the thin BOX 32 and/or STI 36 (FIG. 4) and a short is made with the back gate 34. The logic state for the device 102 may include a logic "0". This is present for devices 11, which occurs two times in FIG. 5. Here, the back gate is shorted to the respective bitline (through contact 38 (FIG. 4)). When the drain contact does not punch through the BOX 32 (no short to the back gate 34, then the logic state for the device 102 may include a logic "1". This is present for the remaining devices (e.g., device 10) in FIG. 5. The remaining transistors 102 may have the same structure as device 10 although different numbers of devices 10 and 11 may be employed.

In the array 100, the FETs are formed with the contact to drain aligned to the edge of the drain so that process variation causes contact shorts to the back gate (or not). Regular FETs are made using the same process except the contacts are within the source and drain regions to ensure the contact never shorts to the back gate. PUF and regular FETs are fabricated with same process. This results in no extra process costs.

The distribution of shorted contacts provides an array pattern that is unique for the array. The location (address) of each shorted contact device provides useful information for the physically unclonable function (PUF) for the array. In one embodiment, the FDSOI chip with on-chip PUF is achieved by intentionally designing the drain contacts of PUF FETs to align at the edge of an active area. Regular FDSOI FETs and PUF FETs are fabricated by the exact same process flow to be cost-effective. The chip, integrated circuit or array can be identified in or by computers, networks systems, etc. for authentication of the chip, integrated circuit or array.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring to FIG. 6, methods for fabricating an integrated circuit with PUF authentication are described in accordance with the present principles. The methods employ manufacturing variability in the fabrication of transistor devices. While the present principles will be described in terms of transistors and shorts to back gates, it should be understood that other structures and features may be employed to provide the PUF capabilities. The integrated circuit may include a fully depleted semiconductor-on-insulator substrate.

In block 202, a lithographic mask is designed/created to provide contact hole features to be aligned with an edge of an active region (e.g., drain) (for at least a portion of a chip). The pattern/mask can be intentionally designed to permit one or more devices to have a contact hole at the edge of an active region (e.g., drain). The other contact holes may be the regular or standard design.

In block 204, an ILD layer is deposited over a gate structure, source regions and drain regions. In block 206, contact holes for first devices and second devices are concurrently patterned (etched) through an ILD layer wherein the first devices include a contact hole aligned to an edge of a respective active region (source or drain), and the second devices include a contact hole aligned to completely land on a respective active region.

In block 208, the contact holes are filled with conductive material to form contacts through the ILD such that a portion of the first devices short the respective active region to a back gate in accordance with processing variations during manufacture of the first devices. The process variations have a small window such that any offset can result in the contact being formed over the edge along a lateral side of the active region (e.g., drain).

Some of the first contacts will extend into the buried dielectric layers (and STI) and some will break through the buried dielectric layer and short to the substrate or back gate. In one embodiment, the contact holes of the portion of the first devices break through the buried dielectric layer. The portion of the first devices provides a logic pattern employed for PUF in chip authentication. In one embodiment, the first and second devices include field effect transistors and the active region includes a drain region (in some embodiments, the source regions may be employed instead of the drain).

In block 210, the integrated circuit may include a memory device having wordlines and bitlines, which are formed in higher metal layers. The contact shorts connect the back gate to respective bitlines. The wordlines form or connect to the gates of the devices (FETs).

In block 212, a logic pattern is represented for an array of devices wherein the first devices with contact shorts represent a first logic state and the first and second devices without contact shorts represent a second logic state. The logic pattern may include a logic "0" for the portion of first devices and a logic "1" for other devices (or vice versa).

In block 214, processing continues to complete the device. In block 216, an identity of the integrated circuit may be authenticated using the logic pattern by a computer system or other hardware device (e.g., a motherboard, a communication device, etc.). The logic pattern is known after the chip or circuit is complete (fabricated). This pattern may be employed as a fingerprint for the chip or circuit and may be employed in an authentication operation for the chip.

In one example, the chip may be identified after its manufacture based on the logic pattern. The logic pattern will substantially be unique for each chip since the number of devices can be very large, and the number of shorted contacts will vary almost randomly for each chip. The chip can then later be identified by reading out the logic pattern from the array of cells fabricated in accordance with the present principles.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Spatially relative terms, such as "beneath," "below," "lower," "above," "upper," and the like, may be used herein for ease of description to describe one element's or feature's relationship to another element(s) or feature(s) as illustrated in the FIGs. It will be understood that the spatially relative terms are intended to encompass different orientations of the device in use or operation in addition to the orientation depicted in the FIGs. For example, if the device in the FIGs. is turned over, elements described as "below" or "beneath" other elements or features would then be oriented "above"

the other elements or features. Thus, the term "below" can encompass both an orientation of above and below. The device may be otherwise oriented (rotated 90 degrees or at other orientations), and the spatially relative descriptors used herein may be interpreted accordingly. In addition, it will also be understood that when a layer is referred to as being "between" two layers, it can be the only layer between the two layers, or one or more intervening layers may also be present.

It will be understood that, although the terms first, second, etc. may be used herein to describe various elements, these elements should not be limited by these terms. These terms are only used to distinguish one element from another element. Thus, a first element discussed below could be termed a second element without departing from the scope of the present concept.

Having described preferred embodiments FDSOI with on-chip physically unclonable function (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. An integrated circuit, comprising:
   an array of devices including one or more first components with contact shorts and one or more second components without contact shorts that provide a logic pattern employed to implement a physically unclonable function (PUF) for chip authentication;
   wherein the logic pattern is determined in accordance with processing variations during manufacture of the array of devices, the logic pattern being represented with a shorted contact based state associated with the one or more first components and a non-shorted contact based state associated with the one or more second components.

2. The circuit as recited in claim 1, wherein the first and second components include field effect transistors which have respective back gates, and wherein the contact short of a given one of the first components is caused by a contact of the given one of the first components being connected to its back gate.

3. The circuit as recited in claim 2, wherein the contact of the given one of the first components is formed at an edge of an active region such that the contact short of the given one of the first components includes the contact breaking through a buried dielectric layer of a semiconductor-on-insulator substrate of the given one of the first components.

4. The circuit as recited in claim 2, wherein the integrated circuit includes a memory device having wordlines and bitlines, wherein a given one of the wordlines and a given one of the bitlines are coupled to the given one of the first components, and wherein the given one of the bitlines is connected to the back gate of the given one of the first components.

5. The circuit as recited in claim 1, wherein the shorted contact based state includes a logic "1" and the non-shorted contact based state includes a logic "0".

6. The circuit as recited in claim 1, wherein the integrated circuit includes a fully depleted semiconductor-on-insulator substrate.

7. The circuit as recited in claim 1, wherein the logic pattern is employed by a computer system to authenticate an identity of the integrated circuit.

8. An integrated circuit, comprising:
   an array of devices including one or more first components with contact shorts and one or more second components without contact shorts that provide a logic pattern employed to implement a physically unclonable function (PUF) for chip authentication;
   wherein the logic pattern is determined in accordance with processing variations during manufacture of the array of devices, the logic pattern being represented with a shorted contact based state associated with the one or more first components and a non-shorted contact based state associated with the one or more second components;
   wherein the one or more first components and the one or more second components each have a fully depleted semiconductor-on-insulator substrate (FDSOI) having a back gate formed below a buried dielectric layer of the FDSOI substrate;
   wherein a given one of the first components has a shorted contact to its back gate in accordance with the processing variations; and
   wherein a given one of the second components has a contact isolated from its back gate.

9. The circuit as recited in claim 8, wherein the contact of the given one of the first components is formed at an edge of an active region such that the contact short of the given one of the first components includes the contact breaking through the buried dielectric layer.

10. The circuit as recited in claim 8, wherein the integrated circuit includes a memory device having wordlines and bitlines, wherein a given one of the wordlines and a given one of the bitlines are coupled to the given one of the first components, and wherein the given one of the bitlines is connected to the back gate of the given one of the first components.

11. The circuit as recited in claim 8, wherein the shorted contact based state includes a logic "1" and the non-shorted contact based state includes a logic "0".

12. The circuit as recited in claim 8, wherein the logic pattern is employed by a computer system to authenticate an identity of the integrated circuit.

13. A method for fabricating an integrated circuit, comprising:
   manufacturing an array of devices including one or more first components with contact shorts and one or more second components without contact shorts that provide a logic pattern employed to implement a physically unclonable function (PUF) for chip authentication;
   wherein the logic pattern is determined in accordance with processing variations during the manufacturing of the array of devices, the logic pattern being represented with a shorted contact based state associated with the one or more first components and a non-shorted contact based state associated with the one or more second components; and
   wherein manufacturing the array of devices comprises:
      concurrently patterning contacts holes for the one or more first components and the one or more second components through an interlevel dielectric (ILD) layer, wherein a given one of the first components includes a contact hole aligned to an edge of an active region of the given one of the first components and a given one of the second components includes a contact hole aligned to completely land on the active region of the given one of the second components; and filling the contact holes with conductive material to form contacts through the ILD, wherein filling the contact hole of the given one of the first components creates the contact short of the given one of the first components by shorting the active region of the given one of the first components to a back gate in accordance with the processing variations.

14. The method as recited in claim 13, wherein the active region includes a drain region.

15. The method as recited in claim 13, wherein filling the contact holes includes breaking through a buried dielectric layer of a semiconductor-on-insulator substrate by the portion of the first components.

16. The method as recited in claim 13, wherein the integrated circuit includes a memory device having wordlines and bitlines, wherein a given one of the wordlines and a given one of the bitlines are coupled to the given one of the first components, and wherein the given one of the bitlines is connected to the back gate of the given one of the first components.

17. The method as recited in claim 13, wherein the shorted contact based state includes a logic "1" and the non-shorted contact based state includes a logic "0".

18. The method as recited in claim 13, wherein the integrated circuit includes a fully depleted semiconductor-on-insulator substrate.

19. The method as recited in claim 13, further comprising authenticating an identity of the integrated circuit using the logic pattern by a computer system.

20. The circuit as recited in claim 2, wherein a given one of the second components has a contact isolated from its back gate that causes the given one of the second components to be without the contact short.

* * * * *